Aug. 17, 1937.  L. M. HARDING  2,089,956

RADIO RANGE COURSE INDICATING DEVICE

Filed Feb. 16, 1934  2 Sheets-Sheet 1

Lawrence M. Harding
Inventor
By J. T. Mothershead
Attorney

Aug. 17, 1937.    L. M. HARDING    2,089,956
RADIO RANGE COURSE INDICATING DEVICE
Filed Feb. 16, 1934    2 Sheets-Sheet 2

EXAMPLE OF FIELD PATTERN OF A RADIO RANGE.

"ON COURSE" LINE WHERE ALTERNATE DOTS AND DASHES INTERLOCK TO FURNISH CONTINUOUS UNBROKEN SIGNAL WHICH INDICATES POSITION OF RANGE COURSE.

Patented Aug. 17, 1937

2,089,956

UNITED STATES PATENT OFFICE 2,089,956

RADIO RANGE COURSE INDICATING DEVICE

Lawrence M. Harding, Washington, D. C.

Application February 16, 1934, Serial No. 711,620

13 Claims. (Cl. 250—11)

(Granted under the act of March 3, 1883, as amended April 30, 1928; 370 O. G. 757)

The invention described herein may be manufactured and used by or for the Government of the United States for governmental purposes only, without the payment of any royalty thereon.

This invention relates to an indicating device for use with radio range systems of the so-called "aural" type.

The invention has many possible uses as a radio aid to navigation and one specific application is to furnish a visual indication of the position of a mobile receiving station with respect to a radio range beacon course. A device constructed according to the invention may operate directly from the output of a radio receiver which is receiving a radio beacon signal of the "aural" type and the visual indication provided by the invention is furnished by an indicating instrument which may be an electrical meter, colored lights or any similar device.

The invention contemplates a combination of circuits and electrical devices which will be operable to receive signals which may be particularly of the alternate interlocking type and which will distinguish between dots and dashes or other similar combinations of interlocked signals and will produce a relatively steady output voltage. No output voltage is obtained from the device when an "on course" signal is received, but when one or the other of the interlocked characteristic signals predominates, the output voltage indicates by polarity and amplitude the direction and comparative distance of the radio receiver from the "on course" position.

In carrying out the invention, I may employ a circuit arrangement which is unique in that it distinguishes between interlocked received signals and having distinguished between these charactistic signals, rectifies and filters the resulting fluctuating currents and accumulates or stores such currents, so that in the output circuit two voltages appear which are essentially non-fluctuating and the magnitude of each of which is proportional to the amplitude of one of the interlocking characteristic receiving signals. The accumulative character of this circuit renders it less susceptible to error from undesired interference and permits a greater sensitivity to be attained. When the transmitted signals are modulated at characteristic frequencies, an electrical filter circuit or a tuned reed motor generator filter may be provided and forms a part of the device.

The proportioning of the component parts of the network is governed by the characteristics of the received signals. The indicating means preferably comprises a voltage controlled vacuum tube circuit with an indicating meter in a bridge circuit which includes the anode circuit of the vacuum tubes, although a sensitive meter connected directly across the two storage circuits may be employed.

Further, the indicating device according to the invention may be used in combination with simple band pass filter circuits for increased selectivity and may be used with simple high pass or low pass filter circuits to separate voice frequencies from the range signals and thereby permit simultaneous range and voice reception on the same radio frequency, when such service is available in the transmitted signals.

In the accompanying drawings are illustrated several examples of means for accomplishing the objects of the invention in which.

Figure 6:
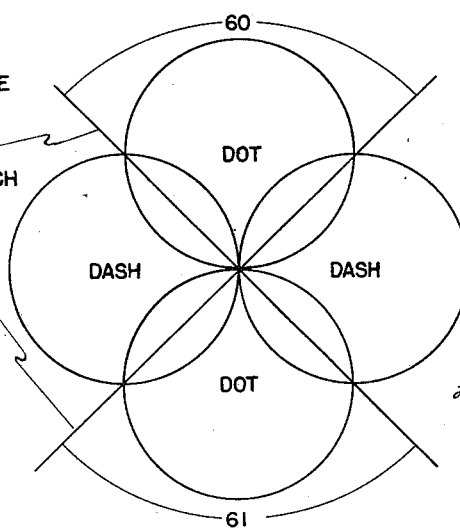

And Figure 6 illustrates a radio range field pattern emanating from a radio range station.

Figure 1:
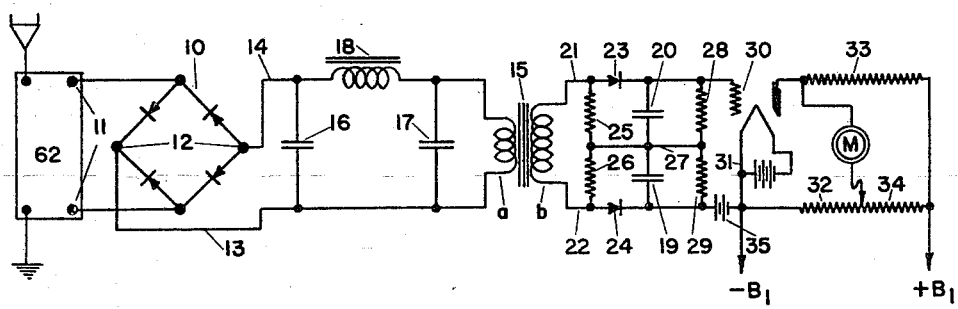
Figure 1 is a diagram of a circuit employing metallic rectifiers and a vacuum tube voltmeter bridge.

In Figure 1 of the attached drawings there is disclosed one embodiment of my invention which comprises a rectifier 10, having two input terminals 11 and two output terminals 12 and which may be of any type, although for convenience a metallic copper-oxide rectifier is shown. Conductors 13 and 14 lead from the two output terminals 12 of the rectifier to a transformer 15. The construction of transformer 15 is preferably such that the inductance of the primary winding $a$ thereof is greatly less than the inductance of the secondary winding $b$ in order to produce high voltage step-up and the differentiating or detecting action required. It has been found that a transformer of the type commonly known as a "microphone to grid transformer" is effective or suitable for the purposes of the invention. A smoothing filter section may be interposed in the circuit between the rectifier 10 and the transformer 15 and may consist of two capacitors 16 and 17 which are shunted across the conductors 13 and 14, and a choke or reactor 18 connected in series in the lead 14 between the capacitors 16 and 17. One end of the secondary winding of transformer 15 is connected by lead 21 to a rectifier 23 and through the rectifier to one side of a capacitor 20. The second terminal of the secondary winding of the transformer is connected by lead 22 to rectifier 24 and through the rectifier to one side of a capacitor 19. Across the two transformer output leads 21 and 22 are connected in series two resistors 25 and 26. A center tap from the secondary of transformer 15 to the common connection between capacitors 19 and 20 may be used instead of the two resistors 25 and 26. The common connection between the two resistors 25 and 26 is connected by lead 27 to the common junction between the capacitors 19 and 20. A resistor 28 is connected across the capacitor 20 and a similar resistor 29 is connected across the capacitor 19. The grid 30 of a vacuum triode is connected to resistor 28 at a point which is also connected to rectifier 23 and capacitor 20. The filament 31 of the triode is connected to resistor 29 at a point which is also connected to rectifier 24 and capacitor 19. The output circuit of the vacuum triode provides a balanced bridge circuit in which the plate-to-filament resistance of the tube constitutes one arm of the bridge and resistor 32 constitutes another. Resistors 33 and 34 constitute the remaining two arms of the bridge. One terminal of an indicating meter is connected to the junction between the plate of the triode and resistor 33, while the second terminal is connected to a tap which provides a variable junction point between resistors 32 and 34. A grid bias battery 35 is inserted in series with the grid-to-filament circuit. Plate voltage is applied to the vacuum tube at points $-B_1$ and $+B_1$. The grid bias battery 35 and the aforesaid plate voltage are so adjusted that the vacuum triode is essentially a linear amplifier. Then the tap providing the variable junction point between resistors 32 and 34 is adjusted until no current flows in meter M. Meter M is preferably a sensitive and suitably damped meter with a zero center scale.

Figure 2:
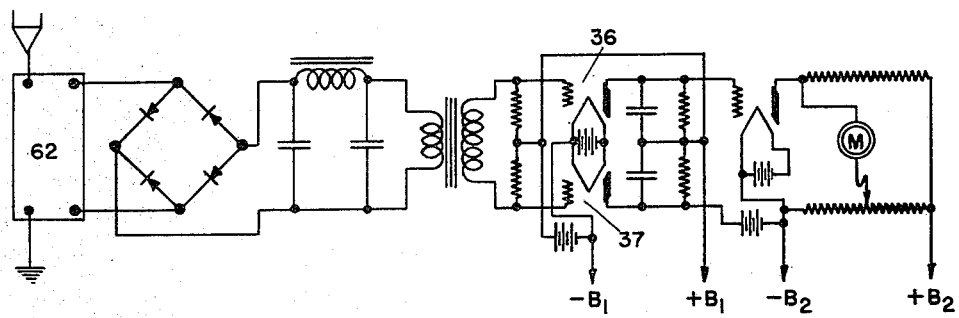
Figure 2 is a diagram employing vacuum tube rectifiers in the transformer output circuit.

The circuit disclosed in Figure 2 is generally similar to the circuit of Figure 1, with the exception that vacuum triodes 36 and 37 are employed as rectifiers in lieu of the metallic rectifiers 23 and 24 of Figure 1.

Figure 3:
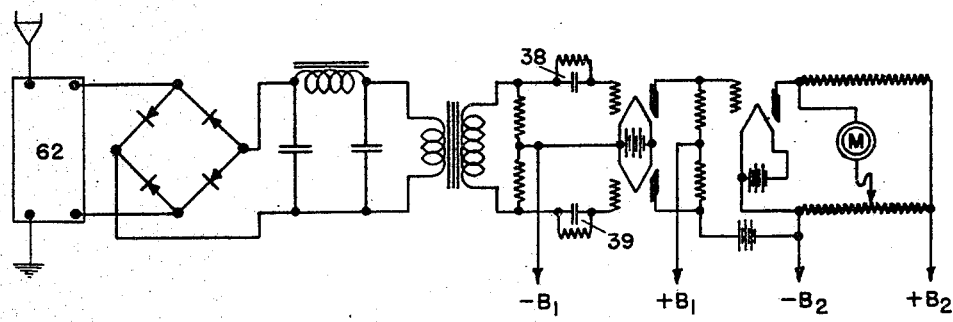
Figure 3 is a diagram similar to that shown in Figure 2 but having the accumulating capacitors in the grid circuits of the rectifying vacuum tubes.

The circuit shown in Figure 3 is generally similar to that disclosed in Figure 2 with the exception that the accumulating capacitors 38 and 39 are in the grid circuit of the rectifier tubes instead of in the output circuit of the triode as is the case in the circuit of Figure 2.

Figure 4:
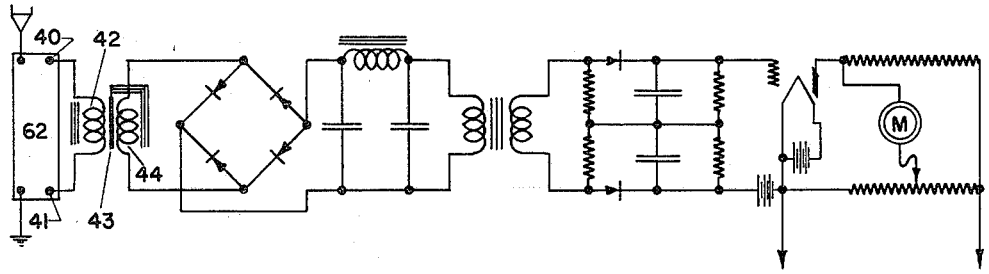
Figure 4 is a diagram similar to Figure 1, showing a "band pass" filter, the one specifically illustrated therein as an example, being of the "tuned reed motor generator type"

The circuit disclosed in Figure 4 is similar to that of Figure 1 and includes in addition a tuned reed motor generator type of band pass filter. The received and detected signal which is at a low frequency signal, is supplied to terminals 40 and 41. The electric field set up in primary winding 42 varies at a rate corresponding to the low frequency signal and actuates reed 43 which is mechanically tuned to the same low frequency as the signal. The reed is thus set in motion by the signal and, in moving, cuts the magnetic field surrounding coil 44, which is constructed on a permanent magnet, thereby changing the flux surrounding coil 44 and inducing therein a low frequency signal corresponding in frequency and amplitude to the original signal supplied to terminals 40 and 41. However, since the signal has been transmitted via a mechanically resonated member, reed 43, interfering or extraneous undesired signals have been removed. The behavior of the remainder of the circuit is similar to that of Figure 1.

Figure 5:
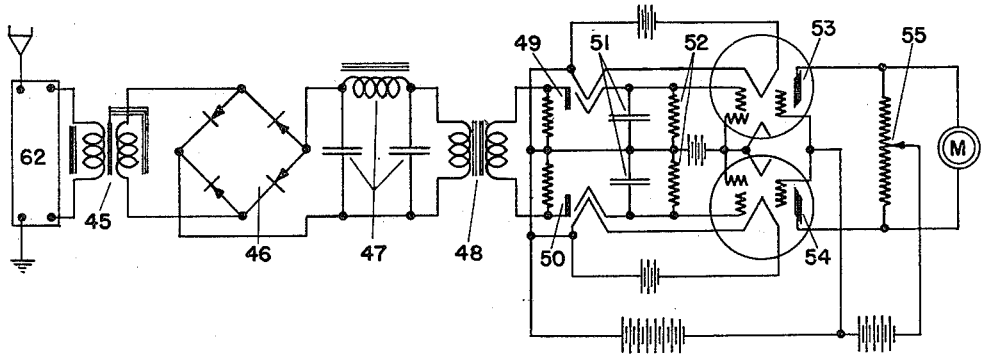
Figure 5 is a diagram similar to Figure 1 but employing vacuum tube rectifiers and two vacuum tubes in the bridge circuit.

The circuit of Figure 5 is, in principle, similar to the circuit of Figure 1, but embodies several additional refinements. The band pass filter 45 is the same as that included in the circuit of Figure 4. The rectifier 46, the filter parts 47 and the transformer 48 perform the same functions described in connection with the circuit of Figure 1. The rectifiers 49 and 50 are vacuum tube diodes having separate heaters and cathodes, but their purpose and behavior is similar to that of the corresponding rectifiers 23 and 24 of the circuit disclosed in Figure 1. Likewise capacitors 51 and their corresponding shunting resistors 52 correspond in purpose and behavior to the similar elements 28 and 29 of the circuits disclosed in Figure 1. The indicating bridge circuit is likewise essentially the same as that of the circuit of Figure 1, with the exception that two vacuum tubes, here shown as pentodes for convenience, are used. The plate resistance of tube 53 constitutes one leg of the bridge circuit and that of tube 54 constitutes the adjacent bridge leg. The purpose, intent and general behavior of this circuit is similar to that of the circuit of Figure 1, but it also incorporates several refinements which are desirable in view of some of the possible applications of the device. Certain of these refinements and advantages are as follows:

(a) The balanced bridge output circuit permits variations in plate voltages and filament voltages without requiring a rebalancing of the bridge by adjustment of potentiometer 55; and (b) The circuit arrangement is such as to permit combining of the filament heater voltage source in a single source, and also to permit possible combination of the four vacuum tube elements into only two multi-element vacuum tubes similar to vacuum tubes commercially available.

The action of the circuit disclosed in Figure 1 is as follows: The input to the rectifier 10 is alternating current, broken up into characters, as obtained at the output of a radio range receiver 62 being preferably single dots and dashes, and being alternated and interlocked so that when the alternate characteristic signals are equal in amplitude, a steady direct current flows in the primary winding of transformer 15 and when this current reaches a steady state no indication will be provided at the output of the device. Assuming that the interlocking signals consist of alternate single dots and dashes, if the dot signals predominate by reason of the mobile receiving station being off course and in either sector 60 or 61 between "on course" positions (see Fig. 6), the current in the transformer primary will increase at the beginning of the dot impulse and decrease at the termination of the impulse of the same character. This sudden current increase and rapidly following decrease produce in the secondary of the transformer 15 two corresponding pulses which flow in opposite directions in the secondary, but due to the design and construction of the transformer 15, the current pulse is greater in one direction than in the other and consequently a greater amount of energy is rectified by 23 or 24 and stored in one of the two capacitors 19 or 20, depending upon the manner in which the transformer secondary is connected to the rectifiers 23 and 24.

On the other hand if the dash signals predominate, the current in the primary of the transformer decreases at the beginning of a dot impulse and increases at the termination of the impulse of the same character. This effect produces two corresponding current pulses of unequal amplitude in the secondary of the transformer 15, just as in the case of a predominating dot signal, with the exception that in this case the greater pulse is in a direction opposite to that obtained when the dot predominates. The current due to this differential in pulse amplitudes is rectified and stored in one of the capacitors 19 or 20 depending upon the manner in which the transformer secondary is connected, just as in the case of the predominating dot character. The resultant voltage through the two series connected capacitors 19 and 20 is then indicative of the identity and magnitude of the predominating character of the characteristic signals. The resistors 28 and 29 which are shunted across the capacitors 19 and 20 are adjusted so that the time constant of each capacitor 19 or 20 and resistor 28 or 29 is suitable for filtering a series of the charging impulses and producing an essentially steady voltage across each capacitor, the magnitude of this voltage being governed by the magnitude of the current change taking place in the primary of the transformer 15.

Since, at points adjacent to an interlocking signal radio range course, the difference between the amplitudes of the characteristic signals is small, it is important that the overall sensitivity of the device be relatively high. Consequently, as an indicator, this embodiment of the invention employs a special vacuum tube bridge arrangement, which in operation consumes almost none of the power stored in the capacitors 19 and 20 with consequent increase in overall sensitivity of the device. The magnitude and polarity of the resultant voltage across capacitors 20 and 19 are indicated by connecting the grid 30 and the filament 31 in series with the two aforesaid capacitors. The vacuum tube grid bias battery 35 and plate current supply battery connected across $-B_1$ and $+B_1$ are adjusted as heretofore described. Then when the algebraic sum of the voltages across the two series capacitors 19 and 20 is equal to zero, the needle of meter M rests at a zero center scale point. Then if the algebraic sum of the aforedescribed voltages across the series capacitors 19 and 20 is positive, the needle of meter M will rest in one direction from normal, while if the resultant voltage is negative, the meter needle will rest in the opposite direction from normal. The amplitude of the deflection of the needle will correspond to the magnitude of the algebraic sum of the voltages across capacitors 19 and 20.

Some of the new and unique advantages obtained with the device represented by the circuit shown are as follows:

(a) An indicating device is provided which distinguishes between two alternate interlocked signals, furnishes a relatively steady indication of which of two interlocking signals predominates and indicates the comparative degree of predominance.

(b) Without the band pass filter, which is a refinement and not an essential part, the device constitutes an electrical circuit without moving mechanical parts, which will furnish at the output thereof a voltage which may be used to operate any indicating device, mechanical or electrical. This output voltage is zero when the input to the circuit consists of alternate interlocked signals of equal amplitude, and the voltage increases positively when one of the alternate signals is greater in amplitude and increases negatively when the other alternate signal is greater in amplitude. With a given interlocked signal and with one or the other of the alternate signals predominant, the output voltage will assume an essentially steady state and as such may be used to operate the aforedescribed indicating device.

(c) The device constitutes a combination of electrical circuits and apparatus which is sufficiently sensitive to accurately indicate position with respect to an interlocked radio range course when supplied with a signal from a radio receiver of five milliwatts or less of power. Greater or lesser sensitivities are obtainable, but this combination is capable of greater sensitivity than can be obtained from any known similar device.

(d) The method used for achieving indication constitutes separation of the detecting or differentiating function of the device from the indicating portion of the circuit, thereby permitting the introduction of filtering or damping elements and the production of a steady indication of the relative amplitude of the alternate interlocking characters of the signal.

While several examples of circuits and arrangements of instrumentalities have been shown, it is to be understood that variation and modification may be made without departing from the spirit of the invention, and therefore the invention is only to be limited by the terms of the appended claims.

What is claimed is:

1. A device for indicating the relative strengths of two alternate, interlocked, electrically transmitted signals comprising means for receiving said signals, means for producing from the two received signals a direct current having components which are respectively proportional in strength to the strengths of the received signals, means for securing from said direct current components two series of current impulses which are respectively proportional in strength to the strengths of the received signals, means for separately and cumulatively storing said two series of current impulses in order to provide two stores of current each including a plurality of current impulses, and means connected to be affected by both said stores of current for indicating the predominant current and the degree thereof.

2. A device for indicating the relative strengths of two alternate interlocked electrically transmitted signals, said device comprising means for receiving said signals, means for producing from said received signals two current impulses which are respectively proportional in strength to the amplitudes of the received signals, means for separately and cumulatively storing a plurality of like current impulses to provide separate and substantially steady stores of energy, and means for indicating the relative amounts of stored energy in said means and thereby indicating the relative amplitudes of said received signals.

3. A device for indicating the relative strengths of two alternate interlocked electrically transmitted signals, said device comprising means for receiving said signals, means for transforming the received signals into current impulses of opposite polarity and of strengths respectively proportional to the amplitudes of the received signals, means for cumulatively storing impulses of like polarity over a plurality of impulses to provide separate and substantially steady stores of energy, and means for indicating the relative amounts of stored energy in said means and thereby indicating the relative amplitudes of said received signals.

4. An apparatus for indicating the relative amplitudes of two alternate interlocked electrically transmitted signals, comprising means for receiving said transmitted signals, means for changing the resultant alternating currents to a single direct current which fluctuates in accordance with the relative amplitudes of the two received signals, means for converting said fluctuating direct current into two steady currents flowing in opposite directions, means for separately storing said steady currents, and means for indicating the difference between said two steady current flows.

5. An apparatus for indicating the relative amplitudes of two alternate interlocked electrically transmitted signals, comprising means for amplifying and detecting the received signals, means for rectifying the detected alternating currents, a transformer having a primary connected to said rectifying means and a secondary, rectifiers connected in each of the output circuits of the said secondary, a capacitor connected between the output of each rectifier and the electrical center of the said secondary, means for discharging said capacitors whereby a steady current flow is obtained from each capacitor, and a visual indicator connected across the outputs of said discharging means for indicating the predominant current flow from the capacitors and the degree thereof.

6. An apparatus for indicating the relative amplitudes of two alternate interlocked electrically transmitted signals, comprising means for amplifying and detecting said signals, means for rectifying the resultant alternating currents to produce a single direct current fluctuating in accordance with the respective amplitudes of said received signals, a transformer having a primary connected to said rectifying means to be supplied with said direct current and a secondary, a capacitor in each half of the said secondary, rectifiers in the outputs of said transformer secondary, means for discharging said capacitors whereby a steady current flow is obtained from each capacitor, and a visual indicator connected across the outputs of said discharging means for indicating the predominant current flow from said capacitors and the degree thereof.

7. A device for indicating the relative strengths of two received alternate interlocked electrically transmitted signals, comprising means for receiving said signals, means for converting the received signals into a direct current which fluctuates proportionally to the relative strengths of the received signals, means for separating said direct current into two steady currents each of which is proportional to the amplitude of one of said received signals, said separating means comprising a transformer, the primary of which is connected to said converting means and the secondary of which is connected to two rectifying and storing circuits whereby two separate stores of steady current are obtained each of which is proportional in strength to the amplitude of one of said received signals, and an indicator connected between said circuits for indicating the predominant current flow therein and the degree thereof.

8. An apparatus for indicating the relative amplitudes of two received alternate interlocked electrically transmitted signals comprising means for converting the received signals into a single direct current which fluctuates proportionally to the amplitudes of said received signals, means for separating said direct current into two component steady currents, said separating means comprising a transformer, the primary of which is connected to said converting means and the secondary of which is connected to two rectifying and storing circuits whereby two stores of steady current flow are obtained, a space discharge device connected between said circuits, and a responsive indicator operated by the output of said space discharge device for indicating the predominant current flow and the degree thereof.

9. An apparatus for indicating the relative amplitudes of two received alternate interlocked electrically transmitted signals, comprising means for converting the two received signals into a single direct current which fluctuates proportionally to the amplitudes of the received signals, means for indicating the relative amplitudes of the fluctuations in said direct current comprising a transformer, the primary of which is connected to said converting means and the secondary of which is connected through rectifying and filter circuits to space-discharge devices for forming a balanced circuit whereby two steady currents are secured from said single fluctuating direct current, and an indicating device operated by the output of said space-discharge devices for indicating the predominant steady current and the degree of predominance thereof.

10. An apparatus for indicating the relative amplitudes of two received alternate interlocked electrically transmitted signals, comprising means for converting the two received signals into a single direct current which fluctuates proportionally to the amplitudes of the received signals, and means for indicating the relative amplitudes of the fluctuations of said direct current comprising a transformer the primary of which is connected to said converting means and the secondary of which is connected to space-discharge devices, rectifying and filter means connected between said secondary and said space-discharge devices for obtaining two steady current flows from said single direct current, a balanced bridge circuit including said space-discharge devices and controlled by the latter, and an indicating device in said bridge circuit for indicating the relative amplitudes of said current flows.

11. The method of determining the position of a mobile station with respect to a predetermined course which consists in transmitting two alternate interlocked signals defining a course, receiving said signals, converting the alternating currents resulting from said received signals into a single direct current which fluctuates in accordance with the relative amplitudes of said received signals, separating said direct current into two currents each of which is proportional to the amplitude of one of said received signals, cumulatively and separately storing each of said two currents, and indicating the relative strengths of said two currents.

12. A device for indicating the relative strengths of two alternate interlocked electrically transmitted signals, said device including means for receiving said signals, means for producing from said received signals two current impulses which are proportional to the respective amplitudes of the received signals, means for separately storing a plurality of said current impulses to provide cumulative stores of current impulses which are respectively proportional to the amplitudes of the received signals, and indicating means connected to said storing means for indicating the relative amounts of stored energy and thereby the relative strengths of said signals.

13. An apparatus for indicating the relative amplitudes of two alternate interlocked electrically transmitted signals, comprising means for receiving said transmitted signals, means for changing the resultant alternating currents to a single direct current which comprises impulses which are respectively proportional in magnitude to the amplitudes of the two received signals, means for producing from said direct current two accumulated stores of current each of which is produced by a plurality of like impulses and is proportional in strength to one of the received signals, and means for indicating the relative strengths of said accumulated stores of current impulses to thereby indicate the relative strengths of the received signals.

LAWRENCE M. HARDING.